US009592922B2

(12) United States Patent
Aridon et al.

(10) Patent No.: US 9,592,922 B2
(45) Date of Patent: Mar. 14, 2017

(54) SATELLITE SUPPORT STRUCTURE COMPRISING A DAMPING CONNECTING DEVICE

(71) Applicant: AIRBUS DEFENCE AND SPACE SAS, Les Mureaux (FR)

(72) Inventors: Gwenaëlle Aridon, Ayguesvives (FR); Patrick Camarasa, Rebigue (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/038,454

(22) PCT Filed: Nov. 21, 2014

(86) PCT No.: PCT/EP2014/075292
§ 371 (c)(1),
(2) Date: May 21, 2016

(87) PCT Pub. No.: WO2015/075184
PCT Pub. Date: May 28, 2015

(65) Prior Publication Data
US 2016/0288930 A1    Oct. 6, 2016

(30) Foreign Application Priority Data

Nov. 22, 2013  (FR) ...................... 13 61504

(51) Int. Cl.
*B64G 1/22* (2006.01)
*B64G 1/10* (2006.01)
(Continued)

(52) U.S. Cl.
CPC ................. *B64G 1/22* (2013.01); *B64G 1/10* (2013.01); *B64G 1/222* (2013.01); *B64G 1/641* (2013.01);
(Continued)

(58) Field of Classification Search
CPC .......... B64G 1/22; B64G 1/222; B64G 1/226; B64G 2001/228; B64G 1/58; B64G 1/641; B64G 1/64; F16F 1/38; Y10T 16/5383

See application file for complete search history.

(56) References Cited

U.S. PATENT DOCUMENTS 3,559,769 A    2/1971  Arbeitlang
5,641,153 A *  6/1997  Gwinn ................... B60G 13/02
                                        267/140.13
(Continued)

FOREIGN PATENT DOCUMENTS

FR    2 895 052 A1    6/2007
FR    2 967 742 A1    5/2012
WO    2009/066045 A2  5/2009

OTHER PUBLICATIONS

Jones, David I. G., "Handbook of Viscoelastic Vibration Damping," Jul. 2001, John Wiley & Sons Ltd., West Sussex, England.

*Primary Examiner* — Brian M O'Hara
(74) *Attorney, Agent, or Firm* — Im IP Law; C. Andrew Im

(57) ABSTRACT

A satellite support structure to support at least one device of the satellite. The support structure includes structural elements with at least one of the structural elements being a damping connector linking at least two other structural elements of the support structure. The damping connector includes an elastomer element and at least one flat angle bracket having at least two wings to be linked by the respective connectors to the damped structural elements. The elastomer element is made from elastomer material with loss angle δ greater than ten degrees and is arranged such that the transmission of forces between one of the wings of the flat angle bracket and the connectors is achieved entirely via the elastomer element.

14 Claims, 3 Drawing Sheets

(51) Int. Cl.
*F16F 1/38* (2006.01)
*B64G 1/64* (2006.01)

(52) U.S. Cl.
CPC .................. *F16F 1/38* (2013.01); *B64G 1/64* (2013.01); *B64G 2001/228* (2013.01)

(56) References Cited

U.S. PATENT DOCUMENTS

| | | | | |
|---|---|---|---|---|
| 5,755,406 | A * | 5/1998 | Aston | B64G 1/1007 244/159.4 |
| 6,609,681 | B2 * | 8/2003 | Buder | B64G 1/641 244/173.2 |
| 6,626,498 | B1 * | 9/2003 | Ostermeyer | B60P 1/165 298/1 A |
| 2016/0195378 | A1 * | 7/2016 | Medina | B64G 1/641 244/131 |

\* cited by examiner

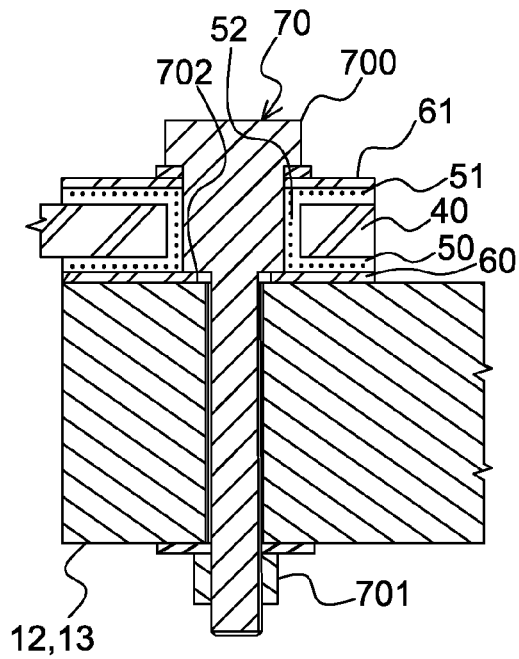
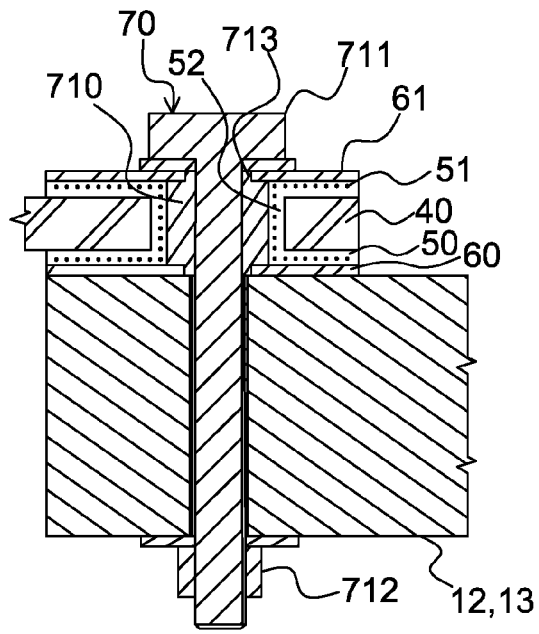
Fig.5
Fig.6
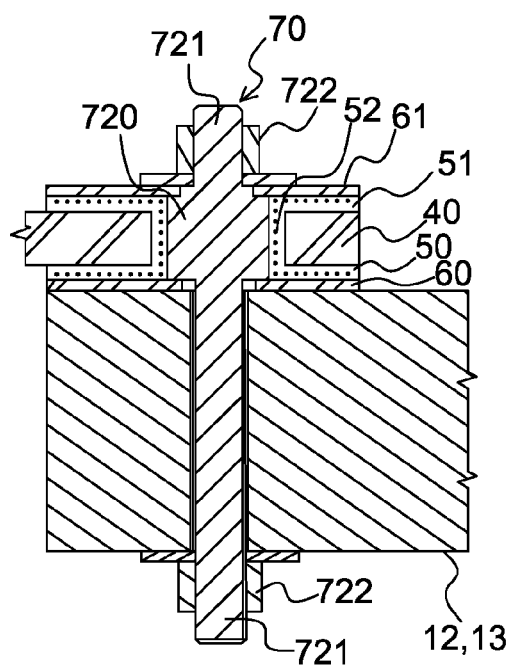
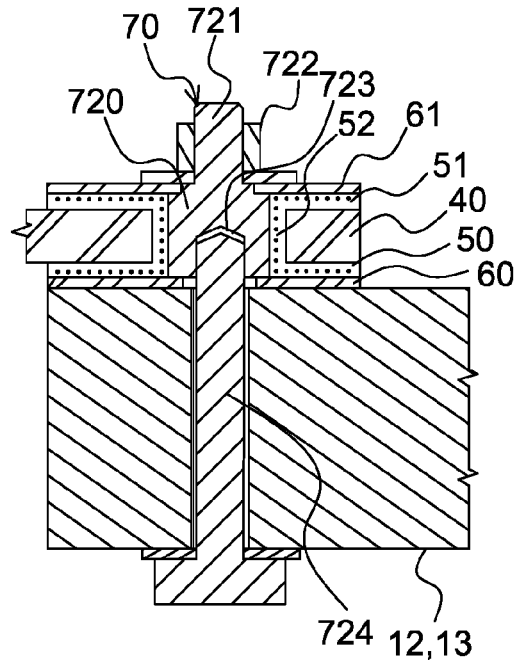
Fig.7
Fig.8

SATELLITE SUPPORT STRUCTURE COMPRISING A DAMPING CONNECTING DEVICE

RELATED APPLICATIONS

This application is a §371 application from PCT/EP2014/075292 filed Nov. 21, 2014, which claims priority from French Patent Application No. 13 61504 filed Nov. 22, 2013, each of which is incorporated herein by reference in its entirety.

TECHNICAL FIELD

The present invention belongs to the field of artificial satellites and more particularly concerns a satellite support structure intended to support one or more devices of said satellite.

BACKGROUND OF THE INVENTION

In known manner, a satellite takes the form of a support structure to which various devices of the satellite are fixed.

The support structure of the satellite is mainly made up of structural elements connected to one another, for example including a frame and a set of panels fixed to said frame. The panels may also be assembled to one another by flat angle brackets, making it possible to dispense with the frame.

The devices of the satellite fixed to the support structure are platform devices (fuel tanks, batteries, telemetry/telecommand antennas, etc.) or payload devices (measuring instruments, telecommunication antennas, etc.).

Vibrations present in a satellite support structure propagate to the various devices of said satellite and notably to the measuring instruments of said satellite.

Vibrations present in the support structure can have a number of causes. For example, when the satellite is launched, the support structure is subjected to vibrations of high amplitude. Moreover, the separation of the stages of the launch vehicle and the pyrotechnic shocks for deploying the appendages can generate shocks in the support structure. In orbit, the actuators of an inertial center of the satellite (for example reaction wheels, gyroscopes, etc.) generate vibrations, of low amplitude compared to the vibrations during launch in particular, that are propagated from said actuators to the measuring instruments via the support structure.

In order to damp the vibrations of a support structure (i.e. to attenuate the amplitude of the vibrations without significantly modifying the resonance modes of the support structure), it is known to fix elastomer means to the areas of said support structure that are deformed the most because the vibrations excite a mode of local resonance of the support structure.

These elastomer means, of flexible stiffness in the direction of deformation of the support structure, are therefore placed in parallel with said support structure. These elastomer means are deformed by the effect of deformations of the support structure and contribute to damping the vibrations of the support structure. For greater efficacy, the preferential mode of deformation of the elastomer means is the shear mode.

However, the vibrations of the support structure are damped only over a very particular area of the support structure (local resonance mode) with the result that it is not possible to damp the vibrations in a wide range of frequencies. In particular it is therefore not possible to damp the vibrations induced by a shock, which in principle cover a very wide range of frequencies and propagate throughout the support structure.

SUMMARY OF THE INVENTION

The present invention has the objective of remedying some or all of the limitations of the prior art solutions, notably those described above, by proposing a solution that makes it possible to attenuate the amplitude of the vibrations of a satellite support structure in a wide range of frequencies (for example between 80 Hz and 500 Hz).

Moreover, the present invention also has the objective of proposing a solution that makes it possible to withstand the forces on launch and/or that does not much modify the resonance modes of the support structure.

In fact, the support structures are generally designed to have resonance modes distinct from the modes of excitation of the launch vehicles. It is therefore clear that a solution leading to modification of the resonance modes of the support structure would be liable to introduce problems of coupling with the modes of excitation of the launch vehicles.

To this end, and in accordance with a first aspect, the present invention concerns a satellite support structure intended to support at least one device of said satellite, said support structure including structural elements. At least one of the structural elements is a damping connecting device connecting at least two other structural elements of the support structure, called "damped structural elements". Said damping connecting device includes elastomer means arranged in said damping connecting device so that the transmission of forces between the two damped structural elements via said damping connecting device is achieved entirely via said elastomer means. Moreover, the elastomer means are made from elastomer material with a loss angle δ (also known as the phase angle) greater than ten degrees.

Throughout the present application, by "elastomer means" is meant one or more components made from an elastomer material.

Because the forces transmitted between the two damped structural elements via the damping connecting device all pass through the elastomer means (in other words the elastomer means are arranged in series between the damped structural elements, and not in parallel with a structural element as was the case in the prior art), said elastomer means are adapted to attenuate vibrations of a number of resonance modes when said resonance modes cause the damping connecting device to function, thus making it possible to cover a wide range of frequencies.

Effective attenuation of the amplitude of the vibrations is moreover achieved because the elastomer means are made from an elastomer material having a loss angle δ greater than ten degrees.

As its name indicates, the damping connecting device is a structural element with damping properties, i.e. the attenuation of the amplitude of the vibrations is achieved without significantly modifying the resonance modes of the support structure. To this end the elastomer means therefore have a stiffness such as not to modify significantly the resonance modes of said support structure.

It should moreover be noted that damping properties are to be distinguished from isolating properties that correspond to filtering of the vibrations characterized by the creation of an isolation mode and its cut-off frequency. Isolation is therefore accompanied by a significant modification of the resonance modes of the support structure.

This distinction between damping properties and isolating properties is known to the person skilled in the art, and reference may in particular be made to the following scientific work: "Handbook of Viscoelastic Vibration Damping", by David I. G. Jones.

A reference structure is considered corresponding to the support structure in accordance with the invention in which the elastomer means have been replaced by rigid means (with a stiffness that may be considered as infinite, for example made of aluminum), with the same geometry as said elastomer means. In known manner, the reference structure has resonance modes and notably a principal resonance mode corresponding to the resonance mode having the highest gain.

The introduction of the elastomer means in accordance with the invention leads to a frequency shift in the resonance modes of the reference structure (only the resonance modes generating deformation energy in the damping connecting device are relevant). The frequency shift is more particularly a reduction of said resonance modes, i.e. a softening.

Throughout the present application, a structural element including elastomer means is considered to have damping properties if the reduction in frequency of the principal resonance mode Fp of the reference structure (among the resonance modes generating deformation energy in the damping connection) as a result of introducing the elastomer means in place of the rigid means referred to above is less than 20% of said principal resonance mode Fp of said reference structure. Consequently, the principal resonance mode F'p of the support structure in accordance with the invention is such that $F'p \geq 0.8 \cdot Fp$. Beyond 20%, the structural element is no longer considered to have damping properties, but instead isolating properties.

In a manner that is entirely equivalent, the principal resonance mode F'p of the support structure in accordance with the invention may be considered.

In this case, a structural element including elastomer means is considered to have damping properties if the increase in the principal resonance mode F'p of said support structure (among the resonance modes generating deformation energy in the damping connection) as a result of replacing the elastomer means with the rigid means referred to above is less than 25% of the principal resonance mode of the support structure in accordance with the invention. Consequently, the principal resonance mode Fp of the reference structure is such that $Fp \leq 1.25 \cdot F'p$ (i.e. $Fp \leq F'p/0.8$). Beyond 25%, the structural element is no longer considered to have damping properties, but instead isolating properties.

Consequently, the elastomer means of the damping connecting device of the support structure in accordance with the invention have a stiffness such that replacing said elastomer means with rigid means leads to a frequency shift of the principal resonance mode of the support structure in accordance with the invention less than 25% of said principal resonance mode.

The frequency shift is evaluated, for example, either by trial or error or by analysis using calculation means known to the person skilled in the art (finite element calculation means, for example), by comparing the frequency response of the support structure in accordance with the invention to the frequency response of the reference structure (with rigid means in place of the elastomer means).

Clearly the stiffness necessary for the elastomer means to have damping properties depends on the overall stiffness of the reference structure. Generally speaking, it is to be noted that, because of the series arrangement of the elastomer means, damping properties are obtained with elastomer means of greater stiffness than produces isolating properties.

In particular embodiments, the support structure may further have one or more of the following features, separately or in all technically possible combinations.

In particular embodiments, the elastomer means have a stiffness greater than $10^6$ (one million) Newtons per meter (N/m), or even greater than $5 \cdot 10^6$ N/m.

Because they have a high stiffness, such elastomer means are further adapted to withstand the forces on launching.

In particular embodiments, the damping connecting device includes at least one flat angle bracket including at least two wings intended to be connected by respective connecting means to the damped structural elements, said elastomer means being such that the transmission of forces between one of the wings of the flat angle bracket, called the "damped wing", and the connecting means of said damped wing is achieved entirely via said elastomer means.

By "flat angle bracket" is meant a shaped element including as indicated two wings forming a section in the shape of an L, T or V.

In particular embodiments, the elastomer means include two elastomer layers arranged on respective opposite sides of the damped wing, and the connecting means of the damped wing include:
two counter-plates stuck against the elastomer layers,
at least one fixing device of said damped wing.

Such features make it possible to damp vibrations in the plane of the damped wing by shear in the elastomer means. The connecting means (counter-plates and fixing device) move in shear relative to the damped wing of the flat angle bracket via the elastomer layers.

In particular embodiments, the elastomer layers and the counter-plates cover at least 50% of the area of the damped wing.

Such features make possible an improved stiffness in shear. In fact, for a given elastomer material, the stiffness in shear is proportional to the area of the elastomer layers and inversely proportional to the thickness of said elastomer layers. Consequently, by having the elastomer layers cover at least 50% of the area of the damped wing (and preferably 80%, or even 90% or more of said area of the damped wing), the area of the elastomer layers will be large. As a result, a high stiffness in shear can be achieved without having to reduce the thickness of the elastomer layers too much.

In particular embodiments, each elastomer layer is less than 2.5 millimeters (mm) thick, preferably between 1.5 mm and 2 mm thick inclusive.

In particular embodiments, each fixing device includes abutment means adapted to guarantee a predefined minimum distance between the counter-plates and clamping means of said counter-plates.

Such features notably make it possible, through an appropriate choice of said predefined minimum distance, for the clamping of the counter-plates not to lead to too much compression of the elastomer layers, which would reduce the effectiveness of the damping by shear of said elastomer layers. Thanks to the abutment means, it is to the contrary possible to control the stress applied to the elastomer layers.

In particular embodiments, the abutment means and the clamping means include a screw assembly with a shoulder/nut.

In particular embodiments, the abutment means are integrated between the counter-plates so that the two counter-plates bear on said abutment means.

In particular embodiments, the abutment means include a pin. The clamping means include, on the side of one of the counter-plates, an element projecting from the pin, said projecting element passing through said counter-plate, and a member adapted to cooperate with the projecting element to place said counter-plate in bearing engagement against the pin.

In particular embodiments, the pin includes, on the side of one of the counter-plates, a blind hole including an internal screwthread. Moreover, the clamping means include a rod adapted to pass through said counter-plate, said rod including an external screwthread adapted to cooperate with the internal screwthread of the blind hole.

Such features make it possible to use the same pin integrated between two counter-plates of a damping connecting device regardless of the thickness of the damped structural element to which the damped wing must be connected. Only the length of the rod will have to take account of that thickness.

In particular embodiments, the abutment means include a smooth opening passing through them and the clamping means include a part adapted to pass through said abutment means.

In particular embodiments, the elastomer means include a conduit around said fixing device between the counter-plates. This conduit communicates between the two elastomer layers.

In particular embodiments, both wings of the flat angle bracket of the damping connecting device are damped wings. In other words, each wing of the flat angle bracket includes elastomer means such that the transmission of forces between said wing and the connecting means of said wing is achieved entirely via said elastomer means.

In particular embodiments, the structural elements include a frame and panels fixed to said frame, said frame consisting of damping connecting devices including respective elastomer means, said elastomer means of each damping connecting device being such that the transmission of forces between the two damped structural elements of each damping connecting device is achieved entirely via said elastomer means.

In accordance with a second aspect, the present invention concerns a satellite support structure intended to support at least one device of said satellite, said support structure including structural elements. At least one of the structural elements is a structural connecting device connecting at least two other structural elements of the support structure, called "attenuated structural elements". Said structural connecting device includes elastomer means in said structural connecting device such that the transmission of forces between the two attenuated structural elements via said structural connecting device is achieved entirely via said elastomer means. Moreover, the elastomer means are made of an elastomer material having a loss angle δ greater than ten degrees and a thickness greater than $10^6$ (one million) N/m.

As indicated above for the damping connecting device of the support structure in accordance with the first aspect of the invention, because the elastomer means are arranged in series between the attenuated structural elements, said elastomer means are adapted to attenuate the amplitude of the vibrations in a wide range of frequencies. Effective attenuation of the amplitude of the vibrations is moreover achieved because the elastomer means are made from an elastomer material having a loss angle δ greater than ten degrees. Finally, because of their high stiffness, greater than $10^6$ N/m, or even greater than $5.10^6$ N/m, such elastomer means are moreover adapted to withstand the forces during launch.

As indicated above, the thickness necessary for the elastomer means to have damping properties depends on the overall stiffness of the reference structure. Consequently, the structural connecting device of the support structure in accordance with the second aspect of the invention does not necessarily have damping properties. However, a stiffness of the elastomer means greater than $10^6$ N/m, or even greater than $5.10^6$ N/m, will make it possible for numerous satellite support structures to have damping properties.

In particular embodiments, the support structure in accordance with the second aspect of the invention may further have one or more of the additional features described above for the support structure in accordance with the first aspect of the invention, separately or in all technically possible combinations.

In particular, in particular embodiments, the structural connecting device includes at least one flat angle bracket including at least two wings intended to be connected by respective connecting means to the attenuated structural elements, said elastomer means being such that the transmission of forces between one of the wings of the flat angle bracket, called the "attenuated wing", and the connecting means of said attenuated wing is achieved entirely via said elastomer means.

In accordance with a third aspect, the present invention concerns a satellite support structure intended to support at least one device of said satellite, said support structure including structural elements. At least one of the structural elements is a structural connecting device connecting at least two other structural elements of the support structure, called "attenuated structural elements". Said structural connecting device includes elastomer means in said structural connecting device such that the transmission of forces between the two attenuated structural elements via said structural connecting device is achieved entirely via said elastomer means. To be more specific, the structural connecting device includes at least one flat angle bracket including at least two wings intended to be connected by respective connecting means to the attenuated structural elements, said elastomer means being such that the transmission of forces between one of the wings of the flat angle, called the "attenuated wing", and the connecting means of said attenuated wing is achieved entirely via said elastomer means.

In other particular embodiments, the support structure in accordance with the third aspect of the invention may further include one or more of the additional features described above for the support structure in accordance with the first aspect of the invention, separately or in all technically possible combinations. In other words, all the embodiments of the support structure in accordance with the first aspect of the invention, in which the damping connecting device takes the general form of a flat angle bracket, may be generalized to a structural connecting device that does not necessarily have damping properties and the elastomer means of which are not necessary made from an elastomer material having a loss angle δ greater than ten degrees.

In accordance with a fourth aspect, the present invention concerns a satellite including a support structure in accordance with any one of the embodiments of the invention and at least one device fixed to said support structure.

DESCRIPTION OF THE FIGURES

The invention will be better understood on reading the following description, given by way of nonlimiting example and with reference to the figures, which show:

FIGS. 5 to 8: sectional views of embodiments of a damping connecting device fixing device.

Figure 1:
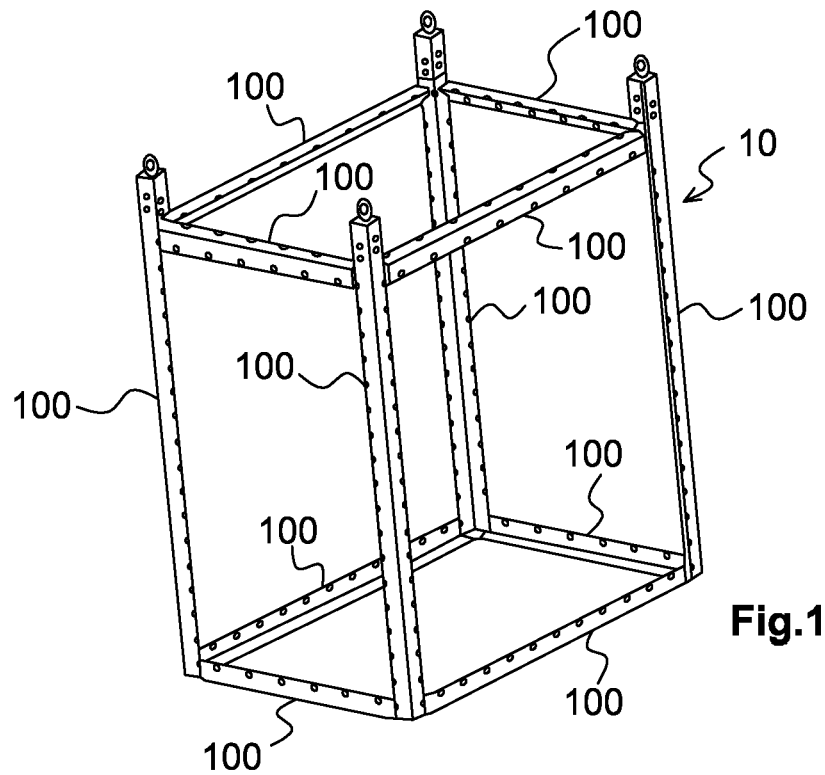
FIGS. 1 and 2: diagrammatic representations of support structures of a satellite.

In these figures, references identical from one figure to another designate identical or analogous elements. For clarity reasons, the elements represented are not to scale, unless otherwise indicated.

DETAILED DESCRIPTION OF EMBODIMENTS

The present invention concerns a satellite support structure intended to support at least one device of said satellite. The support structure of the satellite consists mainly of interconnected structural elements including, for example, a frame and a set of panels fixed to said frame.

In principle, the present invention is based on the integration into the support structure of at least one structural connecting device connecting at least two other structural elements of the support structure. Said structural connecting device includes elastomer means in said structural connecting device such that the transmission of forces between the connected two structural elements via said structural connecting device is achieved entirely via the elastomer means (in other words the elastomer means are arranged in series between the connected structural elements).

Because of this series arrangement, such elastomer means make it possible to attenuate vibrations in a wide range of frequencies (for example between 80 Hz and 500 Hz) for sine, random or shock excitations.

In the remainder of the description, the nonlimiting situation is one in which the structural connecting device has damping properties and is referred to hereinafter as a "damping connecting device". The structural elements connected by said damping connecting device are moreover referred to hereinafter as "damped structural elements".

For damping without isolation, said elastomer means have a thickness such that the resonance modes of the support structure are not modified too much relative to a reference structure corresponding to said support structure in which all the elastomer means have been replaced by rigid means (with a stiffness that may be considered infinite, for example made of aluminum) with the same geometry. The stiffness of said elastomer means is preferably greater than $10^6$ N/m, or even greater than $5.10^6$ N/m, in order to withstand the forces during launch, provided that such a stiffness is compatible with obtaining damping properties.

In the remainder of the description, the nonlimiting situation is that in which the damping connecting device takes the form of an angle iron 30, called a "damping angle iron". The damping angle iron 30 includes a flat angle bracket 40 including two wings 41, 42 connected by respective connecting means to the damped structural elements of the support structure.

As indicated above, by "flat angle bracket" is meant any shaped element having two wings forming a section in the shape of an L, T or V (the angle between the wings being obtuse or acute).

In this case, the elastomer means are preferably arranged in series between one of the wings 41, 42 of the flat angle bracket 40 and the connecting means of said wing. Such a wing is referred to hereinafter as a "damped wing".

The damping angle iron 30 may include a single damped wing or two damped wings. In the remainder of the description, the nonlimiting situation is that in which both wings 41, 42 of the flat angle bracket 40 of the damping angle iron 30 are damped wings, and so both wings 41, 42 include elastomer means arranged in series between said wings and the respective connecting means of said wings.

Figure 2:
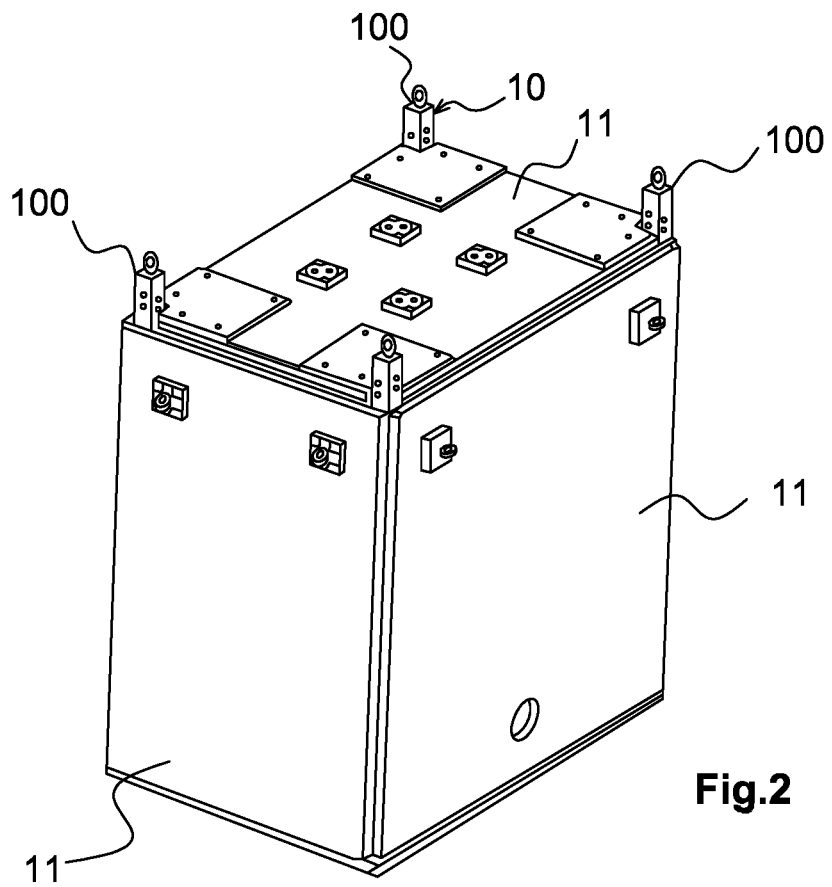

FIG. 1 represents highly diagrammatically structural elements of a satellite support structure corresponding to a frame 10 of polyhedron shape (of rectangular parallelepiped shape in the FIG. 1 example). The frame 10 is intended notably to support other structural elements, for example panels 11 forming external walls of the satellite (visible in FIG. 2). The frame 10 of the satellite consists of components 100 forming the edges of said polyhedron assembled to one another.

Each of the components 100 forming the edges of the frame 10 may be a damping angle iron 30. In order to maximize the damping, all the components 100 are preferably damping angle irons 30.

However, in accordance with other examples, there is nothing to rule out only some of said components being damping angle irons 30, the other components assembling other panels being non-damping angle irons, for example.

Figure 3:
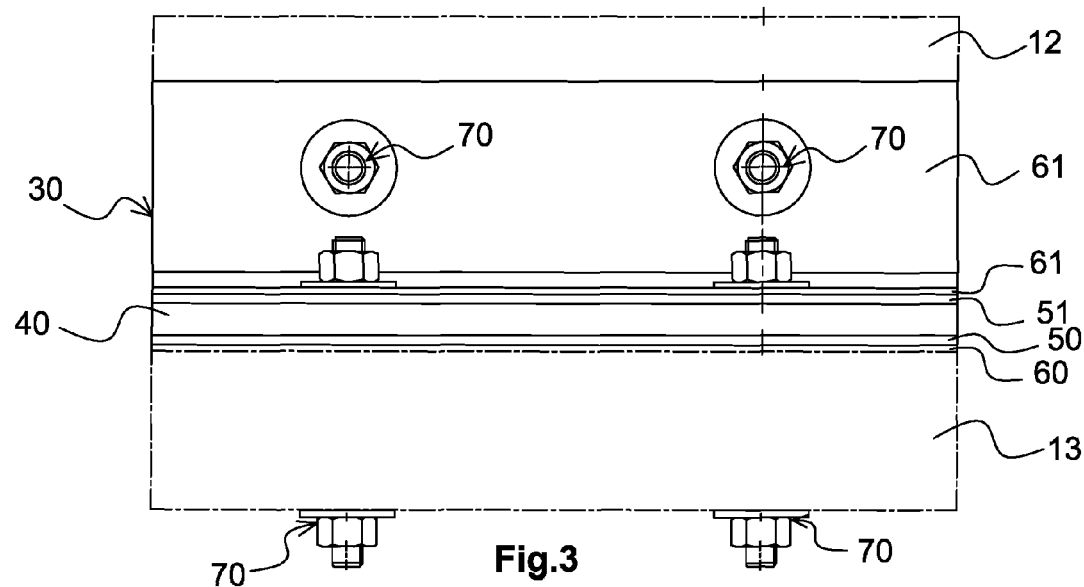
FIGS. 3 and 4: front and perspective views of one embodiment of a damping connecting device in accordance with the invention.
Figure 4:
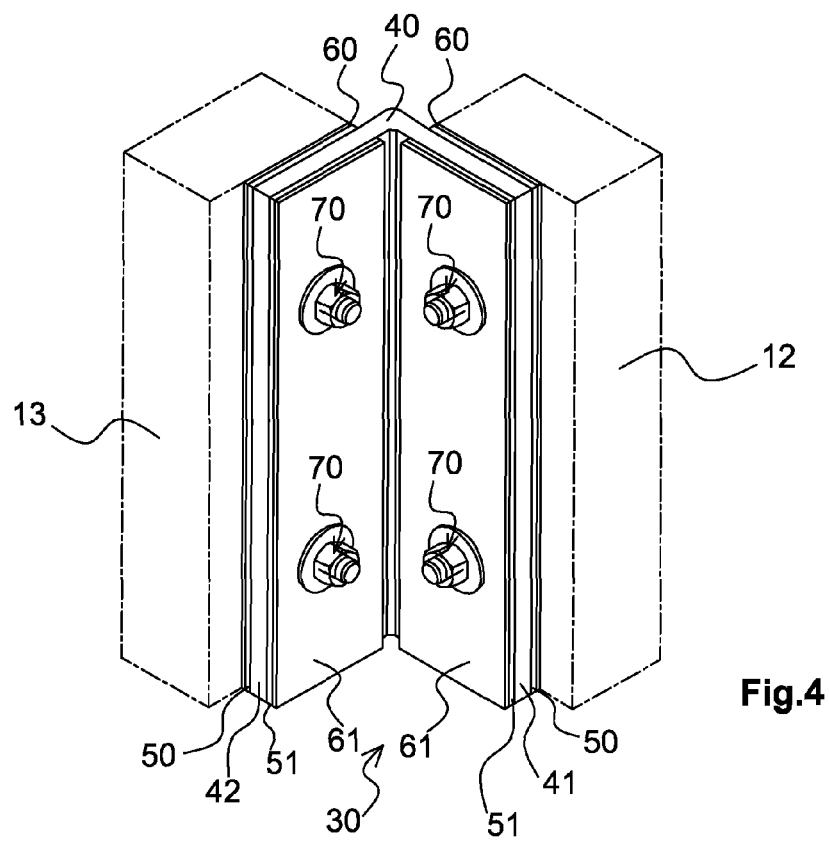

FIGS. 3 and 4 represent front and perspective views of one embodiment of a damping angle iron 30 in which both wings 41, 42 of the flat angle bracket 40 are damped wings. A first wing 41 of the flat angle 40 is connected to a first damped structural element 12. The other wing 42 of the flat angle bracket 40 is connected to another damped structural element 13.

In the example illustrated by FIGS. 3 and 4, the elastomer means for each wing 41, 42 include two elastomer layers 50, 51 arranged on respective opposite sides of the wing 41, 42 concerned. Moreover, the connecting means for each wing 41, 42 include:

two counter-plates 60, 61 arranged against the elastomer layers 50, 51, two fixing devices 70 of said damped wings.

The elastomer layers 50, 51 are stuck against their respective counter-plates 60, 61 and against the wing 41, 42 concerned. Such sticking improves the resistance to forces because the transmission of said forces from the connecting means (in particular the counter-plates) to the elastomer layers (and therefore to the damped wing) is more effective. This sticking is obtained, for example, thanks to intrinsic adhesive properties of the elastic material when molding it at high temperature or by means of a glue at the interfaces between the elastomer layers and on the one hand the counter-plates and on the other hand the damped wing.

The transmission of forces from the connecting means to each wing 41, 42 will load the elastomer means primarily in shear and then pass through the rigid flat angle bracket 40 to reach the opposite wing.

The elastomer layers 50, 51 of a wing 41, 42 function in shear in a plane defined by the wing 41, 42 concerned. The two wings 41, 42 being damped wings, the damping angle iron 30 shown in FIGS. 3 and 4 makes possible damping of the forces by shear in the elastomer means in two non-parallel planes, i.e. with respect to three axes.

In one particular embodiment, the elastomer layers 50, 51 and the counter plates 60, 61 of at least one of the wings 41, 42 cover at least 50% of the area of the wing 41, 42 concerned. In fact, the greater the area of shear of the elastomer layers 50, 51, the higher their stiffness in shear, at constant thickness of said elastomer layers 50, 51. It is therefore possible to obtain a high stiffness in shear without having to reduce the thickness of the elastomer layers 50, 51 too much.

Instead of this or in addition to this, each elastomer layer 50, 51 has a thickness less than 2.5 millimeters (mm), preferably between 1.5 mm and 2 mm inclusive, which makes it possible to ensure that the stiffness in shear will be sufficiently high in most cases.

This is the case in the example illustrated by FIGS. 3 and 4, in which the elastomer layers 50, 51 and the counter-plates 60, 61 of the two wings 41, 42 cover practically all the area of their respective wings 41, 42 with the exception of:
  areas in the vicinity of the junction between the wings 41, 42,
  openings through the counter-plates 60, 61, the elastomer layers 50, 51 and the wing 41, 42 concerned (corresponding through-openings being also provided in the damped structural element 12, 13 to which the wing 41, 42 concerned is connected), in order to allow the passage of the fixing devices 70.

In one nonlimiting embodiment, the counter-plates 60, 61 and the angle bracket 40 are made of aluminum. The elastomer material used to make the elastomer layers 50, 51 is based on bromo-butyl, for example. More generally, any elastomer material compatible with a space application may be used, for example an elastomer based on silicone, natural rubber, etc. The elastomer material used to make the elastomer layers 50, 51 preferably has a loss angle δ (also known as the phase angle) greater than ten degrees, therefore ensuring effective attenuation of the amplitude of the vibrations. The fixing devices 70 are made of steel, for example.

The fixing devices 70 may take any form suitable for fixing the damped wings against the damped structural elements 12, 13. Said fixing devices 70 may moreover assume a different shape from one wing 41, 42 of the angle iron 40 to the other, and even from one fixing device to the other of the same wing 41, 42 of said flat angle bracket 40.

FIGS. 5, 6, 7 and 8 represent sectional views of different embodiments of said fixing devices 70.

In all the examples illustrated by FIGS. 5 to 8, the counter-plates 60, 61, the elastomer layers 50, 51 and the flat angle bracket 40 have an opening through them for each fixing device 70 to pass through.

As illustrated by FIGS. 5 to 8, the elastomer layers 50, 51 join at the level of the through-opening. In other words, the elastomer layers form a conduit 52 inside the through-opening inside which the fixing device 70 passes through the flat angle bracket 40. As a result, at the level of the conduit 52, the elastomer means are loaded in compression between the flat angle bracket 40 and the fixing device 70, which increases their stiffness and therefore their resistance to forces.

Moreover, in all the examples illustrated by FIGS. 5 to 8, the fixing device 70 includes abutment means adapted to guarantee a predefined minimum distance between the counter-plates 60, 61 and the clamping means of said counter-plates 60, 61. The predefined minimum distance imposed by the abutment means is advantageously chosen to avoid applying too high a stress to the elastomer layers 50, 51 when clamping the counter-plates 60, 61.

In accordance with other examples not illustrated by figures, there is nothing to rule out having fixing devices 70 with no abutment means.

In the particular embodiment illustrated by FIG. 5, the abutment means and the clamping means of the fixing device 70 include a screw assembly 700 with shoulder/nut 701.

The length of the shoulder of the screw 700 determines the minimum distance between the counter-plates 60, 61. In the example illustrated by FIG. 5, the shoulder 702 of the screw 700 bears on the counter plate 60. In accordance with other examples that are not illustrated by figures, there is nothing to rule out having a shoulder bearing directly on the damped structural element 12, 13.

FIGS. 6 to 8 represent embodiments in which the abutment means are integrated between the counter-plates 60, 61 with the result that both counter-plates 60, 61 bear on said abutment means. Moreover, when the elastomer layers 50, 51 are stuck against their respective counter-plates 60, 61 and against the flat angle bracket 40, said abutment means are enclosed within the damping angle iron 30.

In a particular embodiment illustrated by FIG. 6, the abutment means include an integral spacer 710 between the counter-plates 60, 61, inside the conduit 52 of the elastomer means. For example, the clamping means take the form of an assembly comprising a screw 711 and a nut 712, said screw passing through:
  the counter-plates 60, 61,
  the elastomer layers 50, 51 and the flat angle bracket 40, via a smooth opening through the spacer 710,
  the damped structural element 12, 13.

The spacer 710 may be entirely integrated between the counter-plates 60, 61 or, as illustrated by FIG. 6, include shoulders with portions 713 passing through said counter-plates 60, 61. The clamping means may take other forms, for example a rod adapted to cooperate with two nuts, etc.

FIG. 7 represents a preferred embodiment in which the abutment means include an integral pin 720 between the counter-plates 60, 61, inside the conduit 52 of the elastomer means. In contrast to the spacer 710 represented in FIG. 6, the pin 720 has a solid body. Moreover, on the side of each counter-plate 60, 61, the pin 720 includes a projecting element 721 passing through said counter-plate. The projecting element 721 on the side of the damped structural element 12, 13 connected to the flat angle bracket 40 also passes through said damped structural element 12, 13. The clamping means include said projecting elements 721 and members 722 adapted to cooperate with said projecting elements to place the counter-plates 60, 61 in bearing engagement against the pin 720. For example, the projecting elements 721 take the form of threaded rods and the members 722 take the form of nuts.

Compared to the embodiment illustrated by FIG. 6, the use of the pin 720 and the members 722 makes it possible to reduce friction between the fixing device 70 and the counter-plates 60, 61 with the result that the transmission of forces is improved.

FIG. 8 represents a variant of the embodiment illustrated by FIG. 7. The pin 720 illustrated by FIG. 8 differs from that illustrated by FIG. 7 in that it includes a projecting element 721 on only one side, here the side opposite the damped structural element 12, 13 connected to the flat angle bracket 40. On the side of said damped structural element 12, 13 the pin 720 includes a blind hole 723 including an internal screwthread.

The clamping means then include, on the side of the projecting element 721, the same type of member 722 as in the embodiment illustrated by FIG. 7. On the side of the damped structural element 12, 13, the clamping means include a rod 724 including an external screwthread adapted to cooperate with the internal screwthread of the blind hole 723 of the pin 720. In the nonlimiting example illustrated by FIG. 8, the rod 724 is the shank of a screw. The length of the rod 724 is chosen as a function of the thickness of the damped structural element 12, 13 it has to pass through, the thickness of the counter-plate 60 bearing on said damped structural element, and the depth of the blind hole 723. The length of the rod 724 is chosen to ensure that said rod 724 passes through the damped structural element 12, 13 and said counter-plate 60 and engages with the blind hole 723 without reaching the bottom of said blind hole.

Compared to the embodiment illustrated by FIG. 7, the use of a pin 720 including a blind hole 723 on the side of the damped structural element 12, 13 to be connected to the flat angle bracket 40 has the advantage that the damping angle iron 30 obtained in this way can be used whatever the thickness of the damped structural element 12, 13 concerned.

More generally, it is to be noted that the embodiments considered above have been described by way of nonlimiting example and that other variants can therefore be envisaged.

In particular, the invention has been described considering a damping angle iron 30 including two damped wings. In accordance with other examples, there is nothing to exclude having a damping angle iron 30 including only one damped wing. As indicated above, such a damping angle iron 30 works in shear in only one plane. In such a case, for reasons of layout, it may be advantageous to provide at least two such damping angle irons 30 such that their elastomer means work in shear in respective non-parallel planes in order to damp forces with respect to three axes.

Moreover, the invention has been described considering two fixing devices 70 per damped wing. In accordance with other examples, there is nothing to rule out considering a different number of fixing devices 70 per damped wing, for example only one fixing device 70 per damped wing or three or more fixing devices 70 per damped wing.

The invention claimed is:

1. A satellite comprising a satellite support structure to support at least one device of said satellite, said satellite support structure comprising:
    a frame having at least one flat angle bracket, the flat angle bracket including first and second wings defining an angle therebetween, each wing having a first and second side;
    at least one panel being connected to one wing of said at least one flat angle bracket by a damping connector;
    the damping connector comprising:
        a first counter-plate located adjacent the at least one panel,
        a first elastomer layer between the first counter-plate and the first side of one wing of the flat angle bracket,
        a second elastomer layer located adjacent the second side of the one wing of the flat angle bracket,
        a second counter-plate arranged against the second elastomer layer, wherein each of the first and second counter-plates and first and second elastomer layers include through openings to allow the passage of a fixing device.

2. The satellite as claimed in claim 1, wherein at least one of the first and second elastomer layers are made from an elastomer material with a loss angle δ greater than ten degrees and is arranged so that a transmission of forces between one of the first and second wings of the flat angle bracket and the at least one panel is achieved entirely via at least one of the first and second elastomer layers.

3. The satellite as claimed in claim 1, wherein the two wings of the flat angle bracket are damped wings when connected to the dampening connector.

4. The satellite as claimed in claim 3, wherein the elastomer layers and the counter plates cover at least 50% of an area of the damped wings.

5. The satellite as claimed in claim 1, wherein each elastomer layer is less than 2.5 mm thick.

6. The satellite as claimed in claim 5, wherein each elastomer layer is between 1.5 mm and 2 mm thick inclusive.

7. The satellite as claimed in claim 1, wherein the fixing device comprises an abutment configured to provide a predefined minimum distance between the counter plates and a clamper of the counter plates.

8. The satellite as claimed in claim 7, wherein the abutment and the clamper comprises a screw assembly with a shoulder or nut.

9. The satellite as claimed in claim 7, wherein the abutment is integrated between the counter plates so that the two counter plates bear on the abutment.

10. The satellite as claimed in claim 9, wherein the abutment comprises a pin; and wherein the clamper comprises, on a side of one of the counter plates, a projection element projecting from the pin, said projection element configured to pass through said counter plate, and a member configured to cooperate with said projection element to place said counter plate in bearing engagement against the pin.

11. The satellite as claimed in claim 9, wherein the abutment comprises a pin comprising, on a side of one of the counter plates, a blind hole comprising an internal screwthread; and wherein the clamper comprises a rod configured to pass through said counter plate, the rod comprising an external screwthread configured to cooperate with the internal screwthread of the blind hole.

12. The satellite as claimed in claim 9, wherein the abutment comprises a smooth opening passing through therewith; and wherein the clamper comprises a part configured to pass through the abutment.

13. The satellite as claimed in claim 1, further comprising a conduit around said fixing device and between the counter plates.

14. The satellite as claimed in claim 1, wherein each elastomer layer of the damping connector has a stiffness greater than $10^6$ Newtons per meter.

* * * * *